March 8, 1960

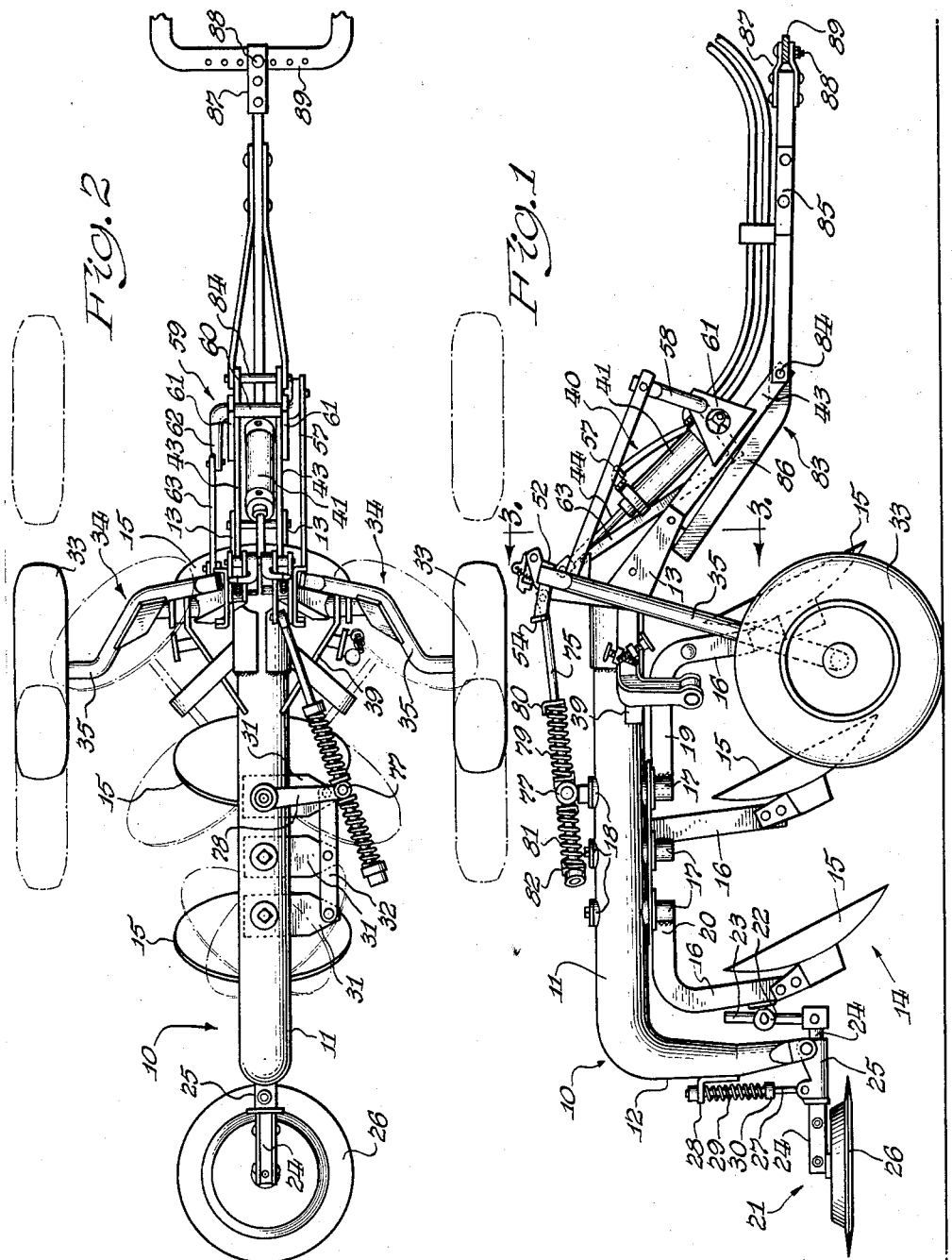

R. H. MILLER ET AL 2,927,650

TWO-WAY PLOW

Filed Aug. 12, 1957

Inventors
Robert H. Miller
Gerald G. Ward
Paul O. Pippel
Attorney

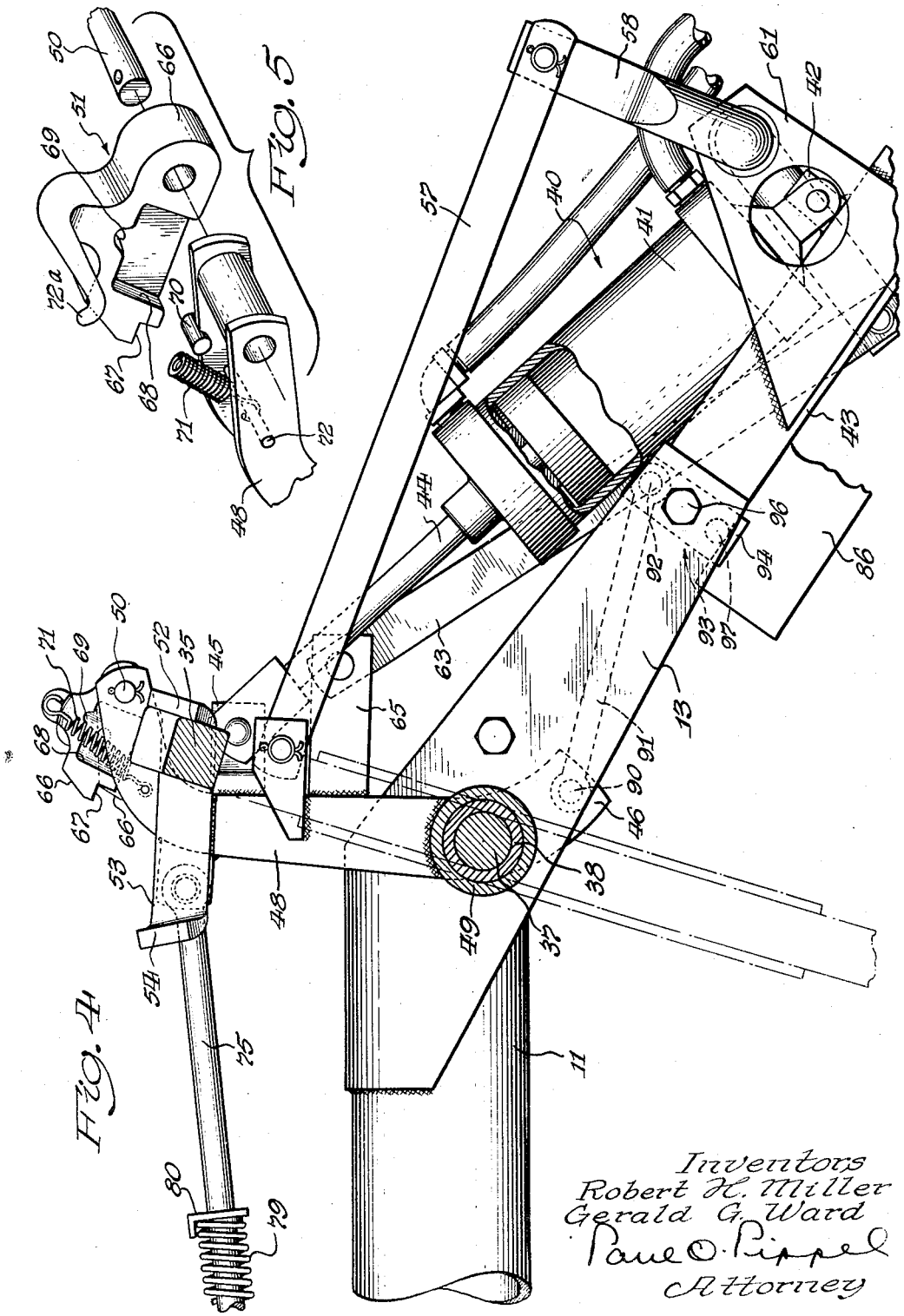

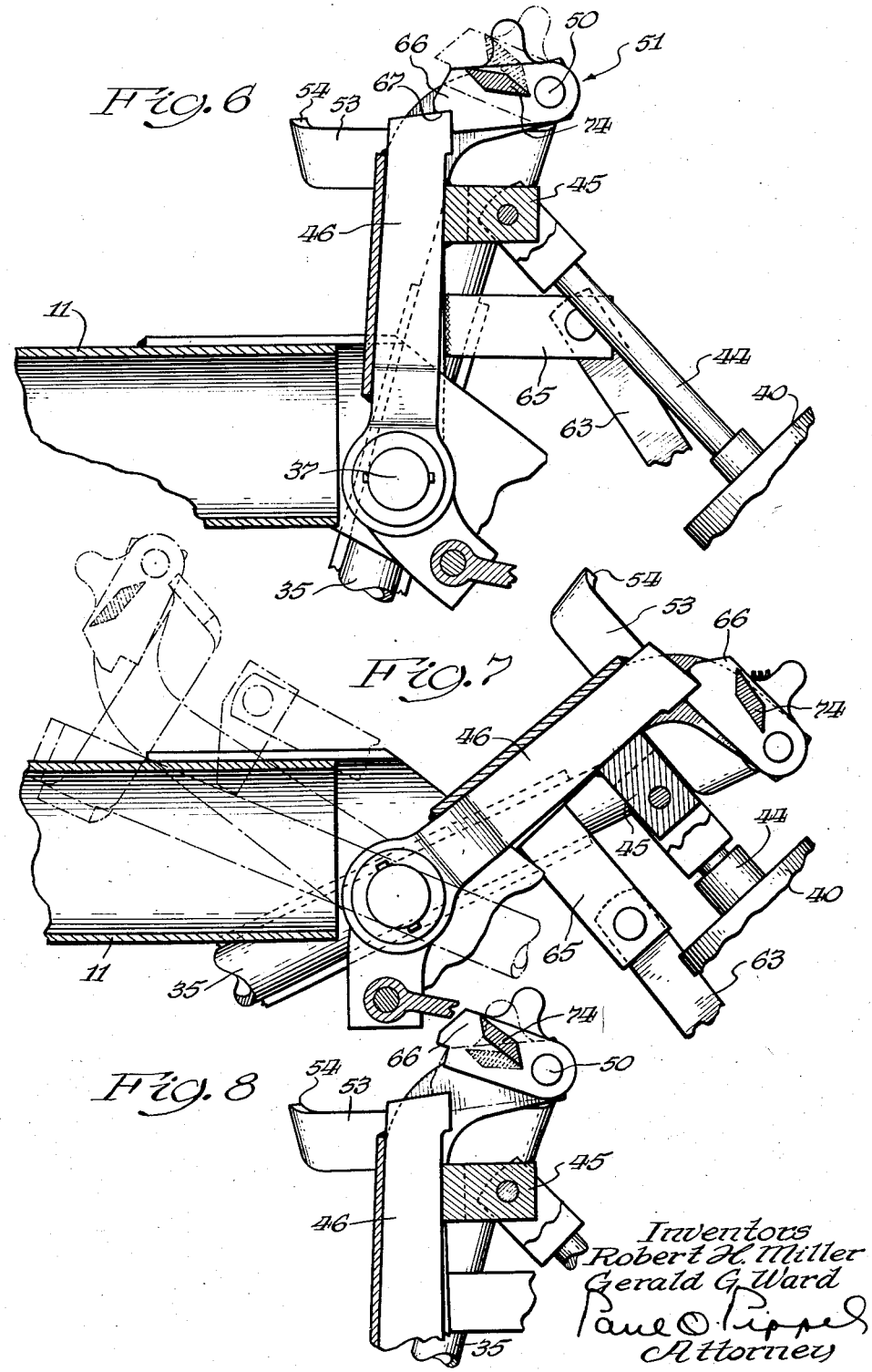

United States Patent Office 2,927,650
Patented Mar. 8, 1960

2,927,650

TWO-WAY PLOW

Robert H. Miller and Gerald G. Ward, Memphis, Tenn., assignors to International Harvester Company, Chicago, Ill., a corporation of New Jersey Application August 12, 1957, Serial No. 677,557

7 Claims. (Cl. 172—211)

This invention relates to agricultural implements and particularly to implements such as plows of the trailing type adapted to be propelled by a tractor or the like. More specifically, the invention concerns a two-way or reversible disk plow wherein a single gang of disks arranged diagonally of the path of travel, is shiftable from one diagonal to the other for right and left-hand plowing.

An object of the invention is the provision of an improved two-way plow of novel construction wherein defects in prior implements of this type have been remedied.

An implement of this type generally has an elongated supporting frame having a rearward overhang and usually a rear furrow wheel which tends to scrape the ground when the implement is transported on its supporting wheels. Therefore, another object of this invention is the provision of means incorporated in the plow and the lifting means therefor for giving additional clearance to the tail wheel.

Another object of the invention is the provision of an improved reversible disk plow of the trailing type supported by wheels wherein each of the wheels alternately serves as a gauge wheel and as a furrow wheel when the disk gang is shifted from one of its operating positions to the other.

Other objects and advantages of the invention will become clear from the following detailed description when read in conjunction with the accompanying drawings wherein:

Figure 1 is a view in side elevation of a reversible disk plow embodying the features of this invention attached to a tractor drawbar to be propelled thereby;

Figure 2 is a plan view of the structure shown in Figure 1;

Figure 4 is a section taken on the line 4—4 of Figure 3;

Figure 5 is an exploded view in perspective illustrating a portion of the latching apparatus;

Figure 6 is a section taken on the line 6—6 of Figure 3;

Figure 7 is a view similar to Figure 6 showing a position of the parts when the implement is in one of its operating positions;

Figure 8 shows a portion of the structure of Figure 6 in another position of the parts;

Figure 3:
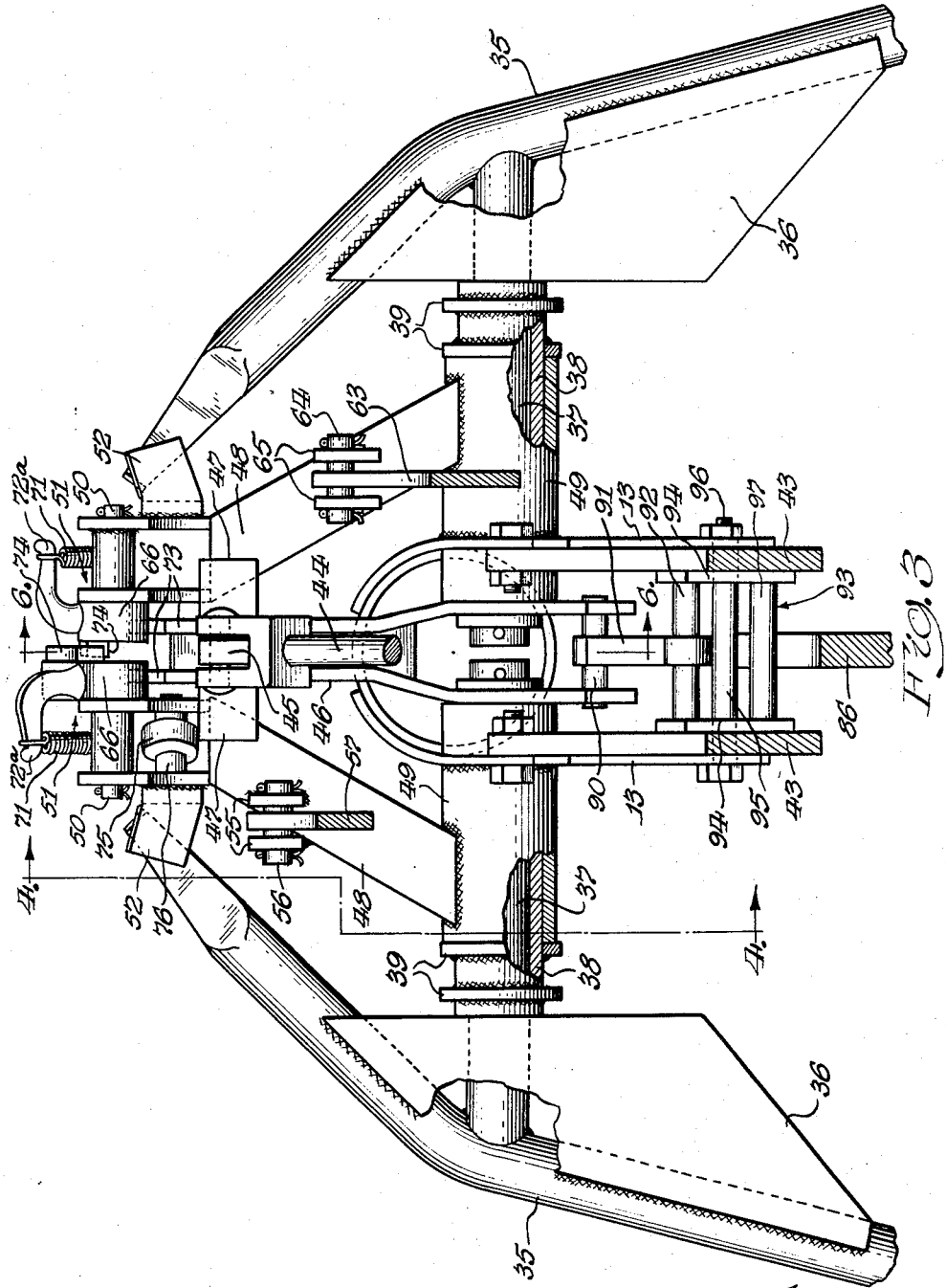
Figure 3 is a detail on an enlarged scale and represents a section taken on the line 3—3 of Figure 1, of the front end of the implement illustrating a portion of the operating mechanism therefor.

The two-way disk plow of this invention comprises a longitudinally extending frame member 10 having a horizontal portion 11, tubular in cross-section, and a downwardly bent rear end 12. To the forward end of frame member 10 are secured a pair of laterally spaced forwardly and downwardly angled plates 13, the rear ends of which are adapted to fit the curvature of and are secured, as by welding, to the forward end of member 10.

The numeral 14 designates a disk gang comprising three earth-penetrating disks 15 mounted upon the lower ends of standards 16 secured to the lower ends of longitudinally spaced vertically extending spindles 17, the upper ends of which are rotatably received in bearings 18 mounted in the horizontal portion 11 of frame member 10.

Figure 11:
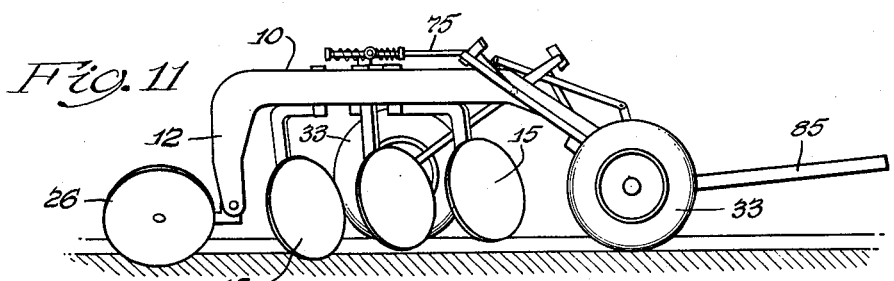
Figure 11 is a diagrammatic view similar to Figure 10 but showing the relationship of the supporting wheels when the disk gang is arranged for right-hand plowing.

The central standard 16 is affixed directly to the central spindle 17 while the forward standard 16 is connected by a horizontal portion 19 to the forwardmost spindle 17 and the rear standard 16 is connected by a horizontal portion 20 to the rearmost spindle 17. When the disk gang is arranged for right-hand plowing, as indicated in Figure 11, the horizontal portion 19 of standard 16 extends forwardly and outwardly to the right diagonally of the line of travel, while the horizontal portion 20 of the rearmost standard 16 extends rearwardly and outwardly to the left side of frame member 10 in alignment with portion 19 so that the disks 15 are arranged on a diagonal forwardly and outwardly to the right as indicated in dotted lines in Figure 2. The solid line position of the disks in Figure 1 is the transport position thereof and other dotted line position indicated is for left-hand plowing.

Although the details of the mounting of disk gang 14, as well as of tail wheel assembly 21 on frame 10 forms no part of this invention a detailed description of a prototype disk gang and tail wheel assembly may be had by a reference to copending U.S. application Serial No. 579,270, filed April 19, 1956. It may be briefly noted that a swivel 22 is carried by the rear standard 16 and slidably receives a lever 23 pivotally mounted on the forward end of a shaft 24 mounted in a bearing 25 pivotally connected to the lower end of frame part 12. Shaft 24 extends beyond the rear end of bearing 25 and has mounted thereon a rear furrow wheel 26. Pivoting of the tail wheel assembly relative to the tool-carrying frame 10 is resisted by the provision of a rod 27 slidably received in an opening provided in a bracket 28 affixed to the frame part 12 and surrounded by a spring 29 engageable with bracket 28 and a collar 30.

Shifting of the disk gang 14 from one operating position to another is accomplished by rotating spindles 17. Each of the spindles has mounted thereon an arm 31, the ends of which are pivotally connected to a strap 32, so that the spindles are rotated in unison. Rocking of the arms 31 to shift the disk gangs is accomplished by mechanism hereinafter to be described.

The reversible disk plow of this invention is a self-supporting implement adapted to be carried, in transport position upon a pair of laterally spaced wheels 33 comprising part of wheel assemblies mounted on opposite sides of the plow frame and designated at 34. The wheel assemblies 34 are substantial duplicates and it is believed that a description of one will suffice for both.

Each wheel 33 is mounted upon a swinging arm 35 which extends generally vertically, as viewed in Figures 1 and 2, and is bent outwardly at its lower end to provide a support for the wheel 33. Each arm 35 is provided with a triangular bracing structure 36 and has secured thereto the outer end of a transversely extending shaft 37 rotatably carried in a bearing 38, the inner end of which is affixed to one of the plates 13 and the outer end of which is supported by a brace 39 secured to the side of the plow frame.

Figure 10:
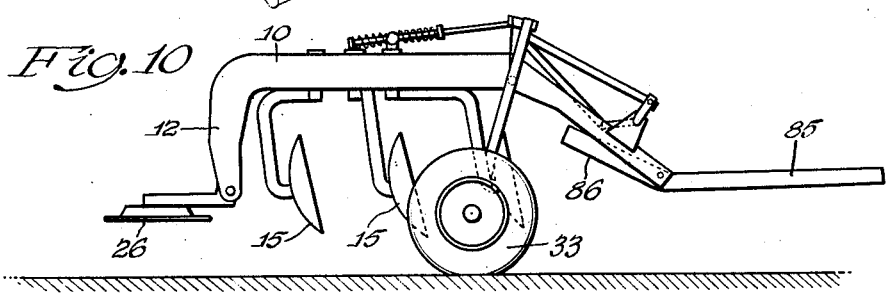
Figure 10 is a diagrammatic side elevation of the reversible disk plow of this invention showing the positions of the frame parts when the implement is in transport position.
Figure 12:
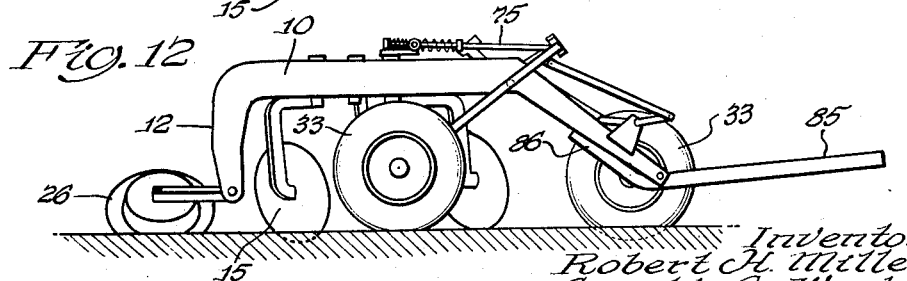
Figure 12 is a diagrammatic side elevation showing the positions of the parts when the disk gang is arranged for left-hand operation.

The shafts 37 are independently mounted and their axes are in transverse alignment. The wheel-carrying arms 35 are thus capable of swinging longitudinally relative to the tool frame 10 from the solid line position of Figure 2 to the dotted line positions indicated. Reference may also be made to the diagrammatic illustrations in Figures 10 to 12, wherein Figure 10 shows the transport position with wheels 33 in transverse alignment and the disks 15 in line with the horizontal portion 11 of frame 10. Figure 11 shows the disks arranged on the right-hand diagonal for right-hand plowing, with the left-hand wheel 33 shifted rearwardly and right-hand wheel 33 shifted forwardly to lower the tool-carrying frame to operating position, with the latter wheel riding in the furrow and the former serving as a gauge wheel and riding on unplowed ground. In Figure 12 the direction of plowing has been reversed with the disks 15 shifted to the left-hand plowing position and with the positions of wheels 33 reversed.

The apparatus provided for vertically moving the implement between operating and transport positions and for shifting the disk gang laterally between its alternate operating positions includes a hydraulic ram 40 comprising a cylinder 41 pivotally anchored to a lug 42 fixed to one of a pair of frame extensions 43 secured to plates 13. A piston rod 44, slidable in the cylinder, is pivotally connected to a lug 45 at the upper end of a lever 46, the lower end of which is bifurcated and apertured to rotatably receive the inner ends of the shafts 37 upon which arms 35 are mounted.

Also secured to the upper end of lever 46 are a pair of ears 47. Ears 47 project laterally from opposite sides of the upper end of lever 46, and in the transport position of the implement engage a pair of upwardly and inwardly inclined actuating members 48 in the form of rockarms, the lower ends of which are affixed to sleeves 49 rockably mounted upon bearing member 38.

The upper end of each of the actuating arm members 48 is bifurcated and curved forwardly and carries a pivot pin 50 upon the inner end of which is mounted a latch member 51.

With particular reference to Figures 3, 4 and 5, in the transport position of the implement the hydraulic ram 40 has been extended and ears 47 on lever 46 engage the actuating members 48. The upper end of each of the wheel-carrying arms 35 is bent inwardly and in the transport position the upper end thereof engages the forward flange 52 of a generally U-shaped member 53 having a rearward flange 54. As shown in Figure 1, the axes of wheels 33 are rearwardly of the axes of shafts 37 upon which arms 35 are mounted, and the weight of the implement holds the upper end of each arm 35 against the forward flange or stop 52.

The right-hand actuating member 48 has affixed thereto a pair of lugs 55 carrying a pivot pin 56 to which is connected the rear end of a link 57, the forward end of which is pivotally connected to the end of arm 58 of a double crank member 59 having a transverse portion 60 rockably mounted in a pair of brackets 61 affixed to extensions 43 of the frame. Crank member 59 is provided with another arm 62 angularly displaced from arm 58 with respect to the axis of the transverse portion 60, and pivotally connected to one end of a link 63, the other end of which is connected to a pivot pin 64 carried by a pair of lugs 65 affixed to and extending forwardly from the left-hand actuating arm 48.

Rocking crank member 59 about its axis, for example, by causing actuating arm 48 to swing forwardly, causes force to be exerted rearwardly through link 63 by arm 62 to rock the arm 48 on the left side of the implement rearwardly. This places the wheels 33 in the position indicated in Figure 12 and lowers the earth-working tools to a position for left-hand operation. Such swinging of right-hand arm 48 forwardly is accomplished by means of the latch mechanism 51. It will be noted that latch member 51 comprises an elongated block 66 mounted at one end on the pin 50 and having a notch 67 formed in its other end. As shown in Figure 5, each block 66 is provided with a cutout portion 68 having a notch 69 therein adapted to receive therein a pin 70 affixed to and projecting inwardly from the upper end of the arm 48.

Latch 51 is urged to a position with pin 70 received in notch 69 by a spring 71 anchored at its lower end to a pin 72 carried by arm 48 and at its upper end to an extension 72a of block 66 projecting laterally therefrom.

One of the arms 48 is swung forwardly by the retraction of ram 40 when the implement is moved from the transport position to one of its operating positions, and this is accomplished by the upper end of one of a pair of extensions 73 on the upper end of lever 46 engaging in notch 67 of one of the latch blocks 66. In Figure 3 the left-hand latch 51 is engaged with the upper end of the associated extension 73 of lever 46 so that upon the next retraction stroke of the piston rod 44 in cylinder 41, left-hand arm 48 will move forwardly, and through the double crank 59 and link 57 will force the other arm 48 rearwardly. When this happens rearmost flange 54 of member 53 engages the upper end of left-hand wheel arm 35 and swings it about the axis of shaft 37 to shift the left-hand wheel 33 rearwardly with respect to the implement frame into a position to function as a gauge wheel. As will be observed from Figure 3, while latch 51 is in the engaged position with the extension 73 of lever 46, right-hand latch 51 has been disengaged by the provision of a cam 74 which has been engaged by a corresponding cam 74 on left-hand latch block 66 to rock the right-hand latch block 66 upwardly about the pivot of pin 50 against the tension in spring 71 to release pin 70 from notch 69.

In the position of the parts shown in detail in Figures 3, 4 and 6, the implement is in raised position with the wheels 33 in transverse alignment and, as shown in Figure 6, notch 67 of the left-hand latch 51 has engaged the edge of the appropriate extension 73 of lever 46 so that, upon retraction of piston rod 44 in the cylinder 41 left-hand arm 48 moves forwardly and forces left-hand wheel 33 rearwardly while right-hand arm 48 moves rearwardly and its associated wheel 33 forwardly to the position indicated in Figure 11. The wheels are thus in position for right-hand operation, and the disk gang is correspondingly shifted by the provision of a connecting rod 75 pivotally connected at one end to a pin 76 carried at the upper end of right-hand arm 48. Rod 75 is slidably receivable in a swivel 77 mounted on the end of an arm 78 affixed to and extending laterally from the forwardmost disk-supporting spindle 17. A coil spring 79 surrounding rod 75 engages swivel 77 at one end and at the other end a collar 80 affixed to the rod. On the portion of rod 75 extending beyond swivel 77 another coil spring 81 surrounds the rod, engaging the swivel 77 at one end and at the other end a collar 82 secured to the end of the rod. When the implement has been raised and the disk gang 14 and tail wheel assembly 21 are in a neutral position, there is substantially no tension upon the springs 79 and 81. When the piston rod 44 is retracted from the position of Figure 3 to move left-hand wheel 33 into gauging relation with the tool-carrying frame and right-hand wheel 33 into the furrow wheel location, causing arm 48 on the right-hand side to swing rearwardly, spring 79 is compressed, providing lost motion until the spring has compressed sufficiently to act upon arm 78, and, through strap 32 and arms 31 to shift the gang to the position of Figure 11. This time lag prior to actual shifting of the disk gang permits the right-hand wheel arm 35 to be swung about its axis by engagement with the flange 52 until the wheel 33 moves past center with respect to the axis of shaft 37 and the upper end thereof swings backward to engage rearward flange 54, permitting swinging of the disks without the danger of contact thereof with the right-hand wheel 33.

When the end of the field is reached the implement is again lifted prior to reversing the direction of plowing. To do this the operator simply actuates the ram 40 to extend the piston rod 44, the engagement of ear 47 with the left-hand arm 48 swinging it upwardly, and through links 57 and 63 and crank member 59 swinging right-hand arm 48 forwardly to a position alongside left-hand arm 48. As this happens, the forward edge of cam block 74 on left-hand latch member 51 engages the rear forward and upwardly slanted edge of the right-hand cam block on its associated latch 51 forcing the left-hand block 66 upwardly with its associated notch 69 out of engagement with peg 70. Notch 67 in the right-hand block 66 then engages the upper edge of the right-hand extensions 73 of lever 46.

Figure 6 shows the transport position of the parts as indicated in Figure 3, in section, and indicating in dotted lines the position of block 66 when it is rocked out of engagement with the upper edge of the lever arm 46.

Figure 7 shows the relationship of parts when the left-hand arm 48 has moved forwardly to the selected operating position of the implement while the dotted line showing indicates the rearwardly swung position of right-hand arm 48.

Figure 8 indicates the parts upon return from the position of Figure 7 to a transport position with the cam member 74 of the left-hand latch block 66 being engaged by the cam block 74 for the right-hand latch block 66, and shown in dotted lines.

The next retraction of piston rod 44 will swing right-hand lift arm 48 forwardly while left-hand arm 48 swings rearwardly to bring the parts into the operating position of Figure 12 with the disk gang 14 reversed and arranged for left-hand plowing. Now the right-hand wheel 38 functions as a gauge wheel while the left-hand wheel 33, extending forwardly, serves as a furrow wheel. As the parts move into this position, spring 81 on rod 75 is compressed until the disk gang is swung to the left diagonal, in the same manner as previously described for shifting the disk gang to the right-hand diagonal.

Figure 9:
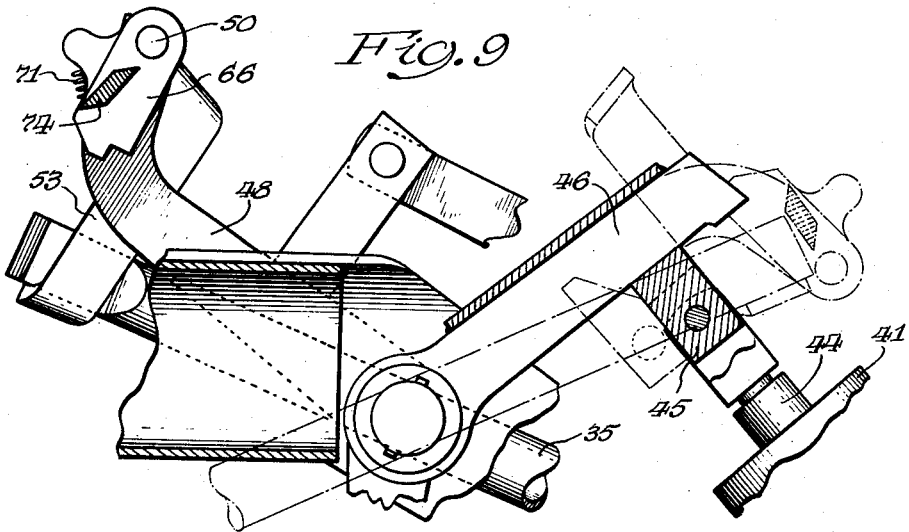
Figure 9 is a sectional view similar to Figure 7 but showing another operating position of the parts.

Figure 9 shows left-hand actuating arm 48 swung rearwardly and in dotted lines the forward position of the right-hand arm. Thus, by virtue of the operation of latches 51, the operation of raising and lowering the implement, reversing the positions of the wheel 33, and reversing the operating position of the disk gang 14 are accomplished automatically.

In implements of this type considerable difficulty has previously been encountered due to the tendency of the rear end of the tool-carrying frame and the tail wheel assembly to ride too close to the ground, sometimes scraping over the ground and interfering with transportation of the implement. It is likewise desirable, however, that the implement be able to float freely in operating position to follow the contour of the ground. With these considerations in mind, applicants have provided a novel hitch and control means therefor comprising a hitch member 83 pivotally mounted medially of its ends on a pivot pin 84 carried at the forward lower end of extensions 43 of the implement frame. Hitch 83 includes a generally horizontal forwardly extending portion 85 and a rearwardly and upwardly bent portion 86. Portion 85 is provided with a clevis 87 pivotally connected by a pin 88 to the drawbar 89 of a conventional tractive vehicle, only the drawbar of which is shown.

The lower end of lever 46 extending below the shaft 37 carries a pin 90 to which is pivotally connected one end of a rod 91, the other end of which is pivoted to a shaft 92 forming a part of a tumbling member 93 comprising laterally spaced plates 94 affixed to a sleeve 95 rotatable upon a bolt 96 extending through plates 13 and extensions 43. Shaft 92 is likewise mounted between the plates 94 and a similar shaft 97 is mounted between the plates 94 on the side of sleeve 95 opposite shaft 92. Thus rocking of lever 46 about the axis of the shafts 37 acts through rod 91 to rock the tumbler 93 about the axis of bolt 96 from a position such as shown in Figure 3 with the implement in transport position and with the shaft 97 of tumbler 93 engaging the upper rear edge of the portion 86 of hitch member 83. Swinging lever 46 forwardly to return the disk gang to one of its alternate operating positions rotates the tumbler 93 about its axis until the shafts 92 and 97 are in general alignment with the plates 13 and extensions 43 so that sleeve member 95 engages the upper rear edge of the hitch member 83. Upon return of the implement to transport position tumbler 93 is again rocked about its axis until shaft 97 presses against the upper edge of the portion 86 of hitch member 83 and rocks it about the pivot 84, as indicated in Figure 1, to secure maximum height of the tail wheel assembly above the ground for transport.

Although the tail wheel assembly 21, per se, forms no part of this invention, it might be noted that by virtue of the sliding connection of rod 23 in swivel 22, lateral swinging of the rearmost standard 16 likewise swings tail wheel 26 about the axis of shaft 24 from one operating position to the other.

The invention has been described in its preferred embodiment. It should be understood, however, that modifications may be made in the invention without departing from the spirit thereof or the scope of the appended claims.

What is claimed is:

1. A two-way plow adapted for connection to a tractive vehicle comprising a longitudinally extending frame, plow elements mounted on the frame for movement relative thereto between alternate right and left-hand plowing positions, wheel-carrying arms swingably mounted on the frame to accommodate vertical movement of the frame between operating and transport positions, and means operatively connecting at least one of said wheel arms to said plow elements to move the latter in response to movement of said wheel arms to vertically move said frame, said last-mentioned means including lost motion comprising relatively movable parts, and spring means opposing the relative movement of said parts.

2. A two-way plow adapted for connection to a tractive vehicle comprising a longitudinally extending frame, plow elements mounted on the frame for movement relative thereto between alternate right and left-hand plowing positions, wheel-carrying arms swingably mounted on the frame to accommodate vertical movement of the frame between operating and transport positions, and means operatively connecting at least one of said wheel arms to said plow elements to move the latter in response to movement of said wheel arms to vertically move said frame, said last-mentioned means including relatively slidable parts, stop means limiting the relative sliding of said parts, and yieldable means opposing said relative sliding.

3. A reversible disk plow adapted for connection to a tractive vehicle, comprising a longitudinally extending frame, a disk gang mounted on the frame for lateral swinging to alternately dispose said gang in positions for right and left-hand plowing, wheel-carrying arms pivoted on opposite sides of the frame, the arm on one side of the frame being swingable to dispose the associated wheel toward the front of the frame to serve as a furrow wheel and the arm on the other side of the frame being swingable to dispose the associated wheel toward the rear of the frame to serve as a gauge wheel, power transmission means on the frame, and means operatively connecting said transmission means to said arms to swing the latter to a transport position of the plow with said frame elevated above the ground and said wheels in transverse alignment, the connection of said transmission means to said arms including latch means alternately connectable to said arms and operable to swing the wheels at the sides of the frame successively in opposite directions forwardly and rearwardly as the plow is moved from a transport to an operating position.

4. A reversible disk plow adapted for connection to a tractive vehicle, comprising a longitudinally extending frame, a disk gang mounted on the frame for lateral swinging to alternately dispose said gang in positions for right and left-hand plowing, wheel-carrying arms pivoted on opposite sides of the frame, the arm on one side of the frame being swingable to dispose the associated wheel toward the front of the frame to serve as a furrow wheel and the arm on the other side of the frame being swingable to dispose the associated wheel toward the rear of the frame to serve as a gauge wheel, power transmission means on the frame, and means operatively connecting said transmission means to said arms to swing the latter to a transport position of the plow with said frame elevated above the ground and said wheels in transverse alignment, and means operatively connecting said transmission means to said disk gang to successively swing the latter laterally to its alternate operating positions in response to lowering the frame from its transport to an operating position, comprising a lever pivoted on the frame and operatively connected to said gang to swing the latter to its alternate operating positions by the swinging of the lever in opposite directions, a rod anchored at one end to said transmission means, means slidably connecting said rod to said lever for sliding movement relative thereto, and a spring on the rod on one side of the lever and engageable therewith, said spring being compressible by movement of the rod in one direction to shift the lever and therefore the disk gang to one of its positions.

5. The invention set forth in claim 4, wherein another spring is provided on said rod on the other side of the lever and engageable therewith for shifting the lever and therefore the disk gang to the other of its positions upon movement of the rod in the other direction.

6. In an agricultural implement adapted for connection to a tractive vehicle having a longitudinally extending tool-carrying frame, wheels supporting the frame for movement thereof vertically between operating and transport positions, a hitch member pivotally connected to the forward portion of the frame on a transverse axis and having a rearward extension separated from the frame during operation of the implement and engageable with the underside thereof when the implement is lifted, and power transmission means operatively connected between said frame and said wheels to raise and lower the frame, including a lever swingably mounted on the frame, a power operated device carried by the frame and connected to said lever to swing the latter, and a rockable member rockably mounted on the frame engageable with the rearward extension of said hitch member, and connecting means between said lever and said rockable member operative to rock the latter upon swinging said lever to pivot the hitch member relative to the frame.

7. The invention set forth in claim 6, wherein said rockable member provides a movable engaging point between said rearward extension of the hitch member and the tool-carrying frame.

References Cited in the file of this patent
UNITED STATES PATENTS

| | | |
|---|---|---|
| 666,949 | Winkler | Jan. 29, 1901 |
| 2,582,337 | Kaltoft | Jan. 15, 1952 |
| 2,764,076 | Fowler | Sept. 25, 1956 |
| 2,767,538 | Scheidenhelm | Oct. 23, 1956 |
| 2,818,007 | Silver et al. | Dec. 31, 1957 |